United States Patent [19]

Gonzales et al.

[11] Patent Number: 5,252,525
[45] Date of Patent: Oct. 12, 1993

[54] COMPOSITIONS FOR FORMING HIGH TEMPERATURE CERAMIC PARTICULATE FILTERS

[75] Inventors: Sandra Gonzales, Blacksburg; Nancy Brown; Jesse J. Brown, both of Christiansburg, all of Va.

[73] Assignees: Virginia Tech Intellectual Properties, Inc., Blacksburg; Center for Innovative Technology, Herndon, both of Va.

[21] Appl. No.: 833,497

[22] Filed: Feb. 10, 1992

Related U.S. Application Data

[62] Division of Ser. No. 676,813, Mar. 28, 1991, Pat. No. 5,087,277.

[51] Int. Cl.⁵ .............................................. C04B 38/06
[52] U.S. Cl. ...................................... 501/124; 501/81; 501/82; 501/95
[58] Field of Search ................ 501/81, 82, 124, 95, 501/125

[56] References Cited

U.S. PATENT DOCUMENTS

| | | |
|---|---|---|
| 907,328 | 12/1908 | Freeman . |
| 4,419,454 | 12/1983 | Long et al. .............. 501/124 X |
| 4,563,432 | 1/1986 | Ehlert et al. . |
| 4,629,483 | 12/1986 | Stanton . |
| 4,692,176 | 9/1987 | Israelson . |
| 4,946,487 | 8/1990 | Butkus . |
| 5,087,277 | 2/1992 | Gonzalez et al. ............ 55/523 |

FOREIGN PATENT DOCUMENTS

| | | |
|---|---|---|
| 4946487 | 8/1990 | Fed. Rep. of Germany . |
| 246921 | 6/1987 | German Democratic Rep. .. 55/523 |
| 0190276 | 10/1984 | Japan .......................... 501/31 |

Primary Examiner—Karl Group
Attorney, Agent, or Firm—Whitham & Marhoefer

[57] ABSTRACT

A high temperature ceramic filter is produced from a composition containing refractory cement, aggregate, pore forming additives, and sintering agents. The pore forming additives are synthetic or organic powders or fibers which sublimate, melt, or otherwise disintegrate to produce In situ pores in the cement during the refractory treatment of a cast filter. The filters produced are permeable to high temperature gases commonly found in a coal furnace and can be used to collect particulate matter present in those gases.

5 Claims, 1 Drawing Sheet

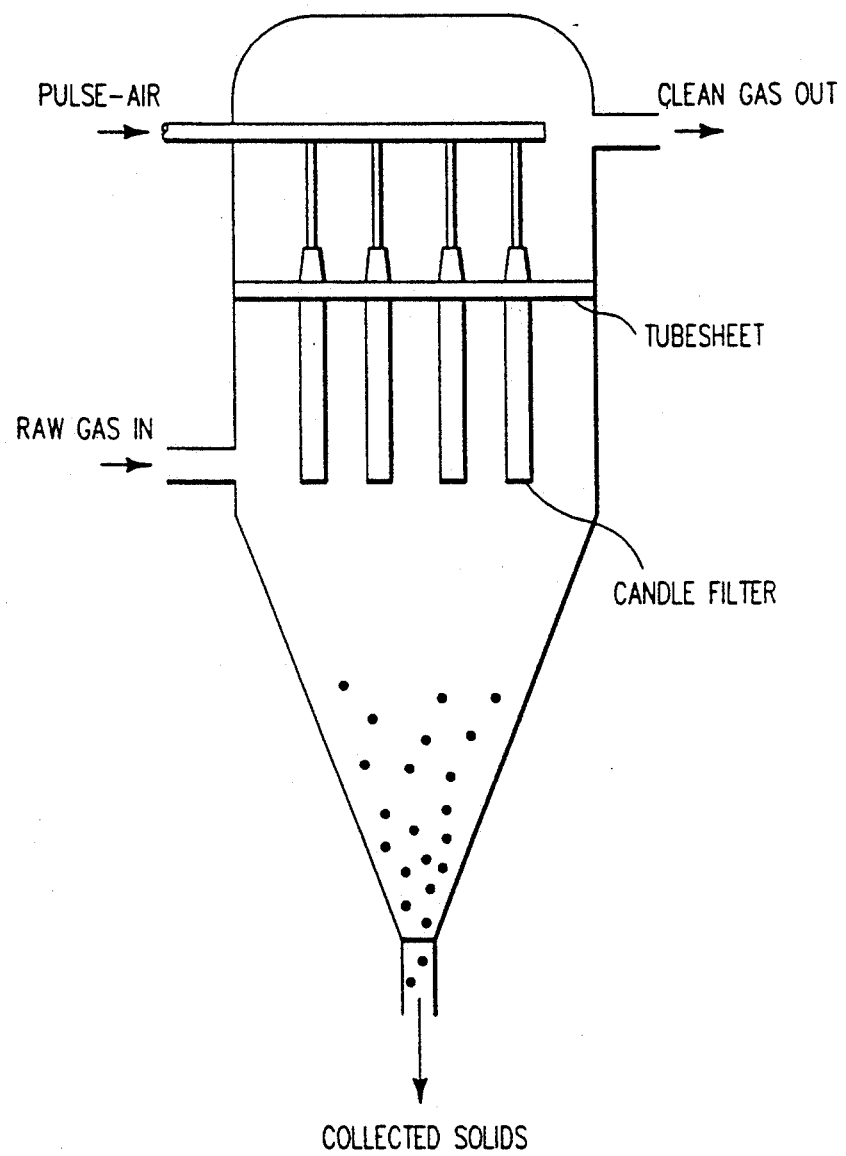

COMPOSITIONS FOR FORMING HIGH TEMPERATURE CERAMIC PARTICULATE FILTERS

This application is a division of co-pending application Ser. No. 07/676,813, filed on Mar. 28, 1991, now U.S. Pat. No. 5,087,277.

BACKGROUND OF THE INVENTION

1. Field of the Invention

The subject invention is generally related to high temperature ceramic particulate filters and, more particularly, to candle filters used in coal combustion systems and a method for their manufacture.

2. Description of the Prior Art

A number of high temperature filtration systems for coal combustion are currently being developed by a number of companies. The economic viability, efficiency, and durability of these systems are largely dependent on the delivery of particulate-free hot gas to the power turbine. A typical filtration system will operate up to approximately 1 megapascal (MPa), which is equivalent to 10 atmospheres or 150 pounds per square inch (psi), and 1000° C. (1850° F.). The filters are subjected to a wide range of stress-inducing forces including vibrations and thermal shock resulting from pulse cleaning. In addition, the filters are subject to corrosion due to the alkali and steam present in the combustion gases. Low level gas phase contaminants such as sulfur dioxide, hydrogen sulfide, and calcium oxide are also sources of corrosion.

The drawing FIGURE shows the flow of gas in a candle filter module. Hot gas from a coal furnace is directed across a plurality of candle filters which hang from a tube sheet. The candle filters are hollow cylindrical members with closed bottom ends and open top ends and are typically hung from the tube sheet by a flange which protrudes from the top end of the candle filter. A typical candle filter is 2-5 inches in outer diameter, 1-3 inches in inner diameter, and 3-4 feet in length. The candle filters are porous and are designed such that particles present in the raw gas are trapped on the outer surface of the candle filters while the gas is permitted to pass through. The clean gas passes upwards through the hollow section of the candle filter and out to a turbine or other element. Over time, a dust cake builds up on the outer surface of the candle filters. To remove the dust cake, a pulse of air is delivered down through the hollow portion of the candle filter which exerts a reverse gas pressure on the outside of the candle that breaks the dust cake from the surface. Fragmented pieces of the dust cake fall into a collection container under gravitational forces.

Prior art candle filters are typically fabricated by bonding silicon carbide (SiC), alumina-silica, mullite, or cordierite grains with a clay binder. Aggregate size (grain) affects the porosity and permeability. It is, of course, the dust cake that builds up on the filtering surface (outside wall) that constitutes the filter most of the time, and is responsible for the filtering efficiency. Some candles incorporate a layer of ceramic fibers or fine grains on the filtering surface (outside wall) of the candle to prevent deep penetration of particles into the filter. Prior art filters have not proved to be durable enough for continuous high temperature use. The clay binder used to bond the ceramic grains eventually forms a brittle glass matrix that is easily damaged by the thermal shock encountered during pulse cleaning. These filters have also tended to be subject to extensive corrosion damage from the alkali and steam which is present in direct coal fired turbine (DCFT) environments.

SUMMARY OF THE INVENTION

It is an object of this invention to provide a new method for manufacturing high temperature ceramic particulate filters.

It is another object of this invention to provide high temperature ceramic candle particulate filters suitable for use in a variety of coal combustion applications.

It is yet another object of this invention to provide a composition of materials suitable for the production of high temperature ceramic filters.

According to the invention, refractory cement is combined with graded refractory aggregate, sintering agents and pore forming additives such as naphthalene and polymer fibers. The composition is cast in a mold constructed to produce a filter, dried, and cured. The resulting cast is then heated to temperatures exceeding 1000° C. under a controlled heating cycle. During heating, the pore forming additives disintegrate to produce pores in situ in the cast (voids where the pore forming constituents had been present). Naphthalene sublimates at 80.2° C. and inexpensive polymers such as polyethylene, polypropylene, and the like typically melt between 170° C. -360° C. Upon cooling, a porous high temperature filter is produced which can be used in numerous coal combustion filtration applications.

BRIEF DESCRIPTION OF THE DRAWING

The single drawing FIGURE is a schematic diagram showing the flow of gases in a candle filter module.

DETAILED DESCRIPTION OF THE PREFERRED EMBODIMENTS OF THE INVENTION

The subject invention is related to a composition and process for making a new class of ceramic particulate filters using refractory concrete, a concrete suitable for use at temperatures up to 1870° C. (3400° F.). Refractory concrete (castable) is combined with pore forming additives such as polymeric fibers or powders, naphthalene, sawdust or other compounds which will disintegrate to create pores or voids in the concrete upon high temperature heating. Graded refractory aggregate, such as pulverized, calcined kaolin, mullite or alumina, as well as sintering agents, such as zinc oxide (ZnO) are included with the composition for binding the resulting filter structure. Ceramic materials, metal reinforcing screen, or graphite fibers can be included to enhance material toughness. The composition is placed in a mold, allowed to cure, and then heated to high temperatures. During high temperature heating, the pore forming additives melt, sublimate, or otherwise disintegrate to create pores or voids within the concrete. After cooling, the filter structure remains porous and can be used to separate particulate matter present in raw gas, such as that produced by a coal furnace.

The types of concrete, aggregate, sintering agents, and pore forming additives used can be varied widely within the practice of the present invention. The concrete should be of the high temperature refractory type which can be cast to form a candle filter or other filter configuration and usable at high temperatures. For example, calcium aluminate cement, phosphoric acid, and phosphates would be suitable binders. The pore forming additives are chosen from those which will sublimate, melt, or otherwise disintegrate at temperatures below those used when subjecting the concrete to refractory conditions. For example, naphthalene sublimates at 80.2° C. and inexpensive polymer fibers such as polyethylene, polypropylene or the like typically melt between 170° C. and 360° C. The pore formers could be selected from suitable organic or synthetic powder or fiber materials. Melting polymers may also help in sintering the filter. As described above, candle filters are hollow cylinders with closed bottom ends. Hence, a mold is required to shape the concrete before curing, drying and heating.

Two candle filters have been prepared from different material compositions containing refractory concrete and pore forming additives. A first composition contained naphthalene and polymer fibers (dacron polyester fibers) as the pore forming additives. The naphthalene is ground to a fine powder of approximately 420 $\mu m$ in diameter, and the polymer fibers are cut into 0.25 to 3 inch pieces. The naphthalene and polymer fibers are combined with calcined kaolin (aggregate:, pyrex glass (sintering agent), calcium aluminate (cement), and alumina fibers. The alumina fibers are added to provide the candle filter with extra strength. The first composition had its constituents present in the following weight percentages: 21.0–23.0% cement, 63.0–66.0% aggregate, 8.84–10.0% naphthalene, 2.56–2.82% sintering agent, 0.12–0.67% alumina fibers, and 0.08–0.20% polymer fibers. A second composition contained polymer fibers (dacron polyester fibers) exclusively as the pore forming additive. The polymer fibers were cut into 0.25, 0.5, and 1.0 inch pieces. The second composition had its constituents present in the following weight percentages: 24.0–26.0% cement, 70.0–73.0% aggregate, 2.74–3.51% sintering agent, and 0.20–0.60% polymer fibers. In both compositions, the aggregate had a maximum particle size diameter of 600 $\mu m$.

The candle filters are formed by mixing the cement, aggregate, sintering agent, and pore forming agent for 3-5 minutes to obtain a homogenous mixture. After combining the constituents, water is added until a placeable consistency for casting is obtained. The wet mixture is cast into a hollow cylindrical mold. The mold may have an appropriate length with an outer diameter of 3 inches and an inner diameter of 1.5 to 1.75 inches. The outer portion of the mold may be made of polyvinylchloride (PVC) tubing and the inner portion of the mold may be a paper tube. The mold can be held together with rubber bands and set in a metal plate to secure its base. After placing the wet mixture of concrete in the mold, the mold is vibrated until the wet mixture attains the shape of the mold. After careful vibration, the mold and its contents are placed in a plastic bag and allowed to cure overnight. After curing, the cured tube (cast) is separated from the mold and allowed to air dry over night. The resulting cast is then heated in an oven according to the following schedule: 24 hours at 100° C.; increase the temperature from 100° C. to 550° C. at a rate of 1° C. per minute (the slow rate of heating gets rid off combined water); hold the temperature at 550° C. for 6 hours; increase the temperature from 550° C. to 1200° C. at a rate of 1° C. per minute; hold the temperature for 24 hours at 1200° C.; then cool to room temperature at a rate of 30° C. per minute. The slow cooling is designed to minimize microcracking within the body of the filter. During the heating process, the naphthalene sublimates and the polymer fibers melt such that a cement candle filter having pores formed in situ is created.

The percent porosity of the candle filters produced has been determined using the Archimedean Principle. The candle filters made from the first composition containing both naphthalene and polymer fibers had a 50.0–57.0% porosity while the candle filters made from the second composition had a 46.0–50.0% porosity. The porosity ranges for both sets of candle filters are sufficient to allow the candle filters to be useful in separating particulate matter in a gas stream such as that which is produced by a coal furnace. The permeability of the candle filters was tested by measuring the pressure drop across the filter at different air velocities. The candle filters formed from the first composition containing both naphthalene and polymer fibers had permeabilities (pressure drops) ranging from 2.96–7.19 mbars. The candle filters formed from the second composition containing only polymer fibers were less permeable and had pressure differentials ranging between 12.39–20.61 mbars. Nevertheless, the permeabilities of the candle filters formed from both compositions were acceptable for their use in a DCFT or other coal fired application.

The candle filters of the present invention will not corrode as quickly as prior art clay and ceramic fiber candle filters. The components of the filter are corrosive resistant at high temperature and contain no glassy phases.

While the invention has been described in terms of its preferred embodiment where polymers and organic constituents have been incorporated in compositions containing refractory concrete, those skilled in the art will recognize that the invention can be practiced with modification within the spirit and scope of the appended claims.

Having thus described our invention, what we claim as new and desire to secure by letters patent is the following:

1. A composition, comprising:
   calcium aluminate cement;
   ceramic aggregate granules;
   toughness enhancing materials selected from the group consisting of ceramic materials, metal reinforcing screen, graphite fibers, and alumina fibers; and
   pore forming additives in the form of organic fibers or powders which disintegrate to leave voids in a mixture of said calcium aluminate cement, said ceramic aggregate granules, and said toughness enhancing materials.

2. A composition as recited in claim 1 wherein said pore forming additives are selected from the group consisting of polyethylene, polypropylene, polyester, sawdust, and naphthalene.

3. A composition as recited in claim 1 further comprising a sintering agent.

4. A composition as recited in claim 3 wherein said sintering agent is zinc oxide.

5. A composition, comprising:
   21–23% calcium aluminate cement;
   63–66% ceramic aggregate granules;
   0.12–0.67% toughness enhancing materials selected from the group consisting of ceramic materials, metal reinforcing screen, graphite fibers, and alumina fibers; and
   8.92–10.2% pore forming additives in the form of organic fibers or powders which disintegrate to leave voids in a mixture of said calcium aluminate cement, said ceramic aggregate granules, and said toughness enhancing materials.

* * * * *